United States Patent
Tao et al.

(10) Patent No.: US 8,301,150 B2
(45) Date of Patent: Oct. 30, 2012

(54) PICOCELL POWER CONTROL

(75) Inventors: Huiyu Tao, Oxford (GB); Hai Zhou, Swindon (GB)

(73) Assignee: Alcatel Lucent, Paris (FR)

( * ) Notice: Subject to any disclaimer, the term of this patent is extended or adjusted under 35 U.S.C. 154(b) by 413 days.

(21) Appl. No.: 12/486,182

(22) Filed: Jun. 17, 2009

(65) Prior Publication Data

US 2009/0318181 A1    Dec. 24, 2009

(30) Foreign Application Priority Data

Jun. 18, 2008  (EP) .................................... 08290579

(51) Int. Cl.
  *H04W 36/00*   (2009.01)
  *H04W 72/00*   (2009.01)
  *H04B 7/00*    (2006.01)

(52) U.S. Cl. ........ 455/444; 455/443; 455/436; 455/445; 455/452.2; 455/522

(58) Field of Classification Search .................. 455/440, 455/441, 442, 443, 444, 522, 69, 127.1, 67.13, 455/226.1, 436

See application file for complete search history.

(56) References Cited

U.S. PATENT DOCUMENTS

| | | | |
|---|---|---|---|
| 6,477,367 B1 * | 11/2002 | Kim | 455/423 |
| 6,999,784 B1 * | 2/2006 | Choi | 455/522 |
| 7,082,305 B2 * | 7/2006 | Willars et al. | 455/441 |
| 7,145,890 B1 * | 12/2006 | Seo et al. | 370/331 |
| 7,286,826 B2 * | 10/2007 | Kim et al. | 455/444 |
| 7,363,039 B2 * | 4/2008 | Laroia et al. | 455/448 |
| 7,634,272 B2 * | 12/2009 | Yamashita et al. | 455/444 |
| 7,835,740 B2 * | 11/2010 | Claussen et al. | 455/435.1 |
| 8,108,003 B2 * | 1/2012 | Claussen et al. | 455/561 |
| 2006/0217121 A1 * | 9/2006 | Soliman et al. | 455/446 |
| 2007/0099645 A1 | 5/2007 | Kim | |
| 2008/0146154 A1 * | 6/2008 | Claussen et al. | 455/63.1 |
| 2011/0244870 A1 * | 10/2011 | Lee | 455/444 |

FOREIGN PATENT DOCUMENTS

EP    1 343 336 A1    9/2003
WO    WO 2006/010958 A2    2/2006

OTHER PUBLICATIONS

European Search Report.

\* cited by examiner

*Primary Examiner* — Tilahun B Gesesse
(74) *Attorney, Agent, or Firm* — Fay Sharpe LLP

(57) ABSTRACT

A method is provided of controlling transmission power of a picocell base station. The method comprises the steps of the picocell base station:

transmitting a signal at a first power; receiving a report from a mobile terminal that the signal is received within a predetermined quality range; dependent upon receiving said report instructing the mobile terminal to report as to the number of neighboring macrocells detected by the mobile terminal; and controlling the transmission power of a further signal dependent upon said number.

10 Claims, 6 Drawing Sheets

PICOCELL POWER CONTROL

FIELD OF THE INVENTION

The present invention relates to telecommunications, in particular to wireless telecommunications.

DESCRIPTION OF THE RELATED ART

Wireless telecommunications systems are well-known. Many such systems are cellular in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells relative to a macrocell. Cells that are smaller than macrocells are sometimes referred to as microcells, picocells, or femtocells, but we use the term picocells generically for cells that are smaller than macrocells. One way to establish a picocell is to provide a picocell base station that operates within a relatively limited range within the coverage area of a macrocell. One example of use of a picocell base station is to provide wireless communication coverage within a building.

The picocell base station is of a relatively low transmit power and hence each picocell is small compared to a macrocell.

Picocell base stations can use broadband internet Protocol connections as "backhaul", in other words they are connected via picocell base station gateways to, for example, a Universal Mobile Telecommunications System (UMTS) core network, specifically each gateway may be connected to a UMTS Mobile Switching Centre (MSC) and hence a Signaling Gateway Support Node (SGNS).

Picocell base stations are intended primarily for users belonging to a particular home or office. Picocell base stations may be private access or public access. In picocell base stations of private access type, access is restricted only to registered users, for example family members or particular groups of employees. On the other hand, in public access picocell base stations, other users may also use the picocell base station, subject to certain restrictions to protect the Quality of Service received by registered users.

Picocell base stations may be used to provide radio coverage where there are coverage "holes" that is areas that macrocells do not cover. However if, the picocell size is set to be too large, in other words, power of transmitted signals from the picocell base station are set to be too high, then the picocell will cause unnecessary interference to neighboring macrocells.

Conversely, if the picocell size is set to be too small, in other words, powers of transmitted signals from the picocell base station are set to be too low, then the picocell will not achieve the aim of filling the coverage hole.

Handover success rate may be used as an indicator that a coverage hole is present, however it is not definitive, as other factors, such as the level of network loading and signaling delays, may also cause handover failures.

SUMMARY OF THE INVENTION

The reader is referred to the appended independent claims. Some preferred features are laid out in the dependent claims.

For example, a method is provided of controlling transmission power of a picocell base station. The method comprises the steps of the picocell base station transmitting a signal at a first power and receiving a report from a mobile terminal that the signal is received within a predetermined quality range. Dependent upon receiving said report the picocell base station instructs the mobile terminal to report as to the number of neighboring macrocells detected by the mobile terminal; and then controls the transmission power of a further signal dependent upon said number.

Preferred embodiments advantageously enable coverage holes between macrocells to be filled by increasing the transmission power of a picocell base station. Preferred embodiments advantageously enable levels of interference experienced by macrocells to be reduced by decreasing the transmission power of the picocell base station. In this way, a steady-state transmission power can be achieved where said number of neighboring macrocells detected is optimum.

The process is preferably automatic, in particular of an auto-configuring nature. Advantageously, in preferred embodiments, manual tuning of transmission power level is not required.

BRIEF DESCRIPTION OF THE DRAWINGS

An embodiment of the present invention will now be described by way of example and with reference to the drawings, in which:

FIGS. 4a and 4b illustrate power levels before adjustment, and FIG. 4c illustrates the power level after adjustment.

DETAILED DESCRIPTION

Figure 1:
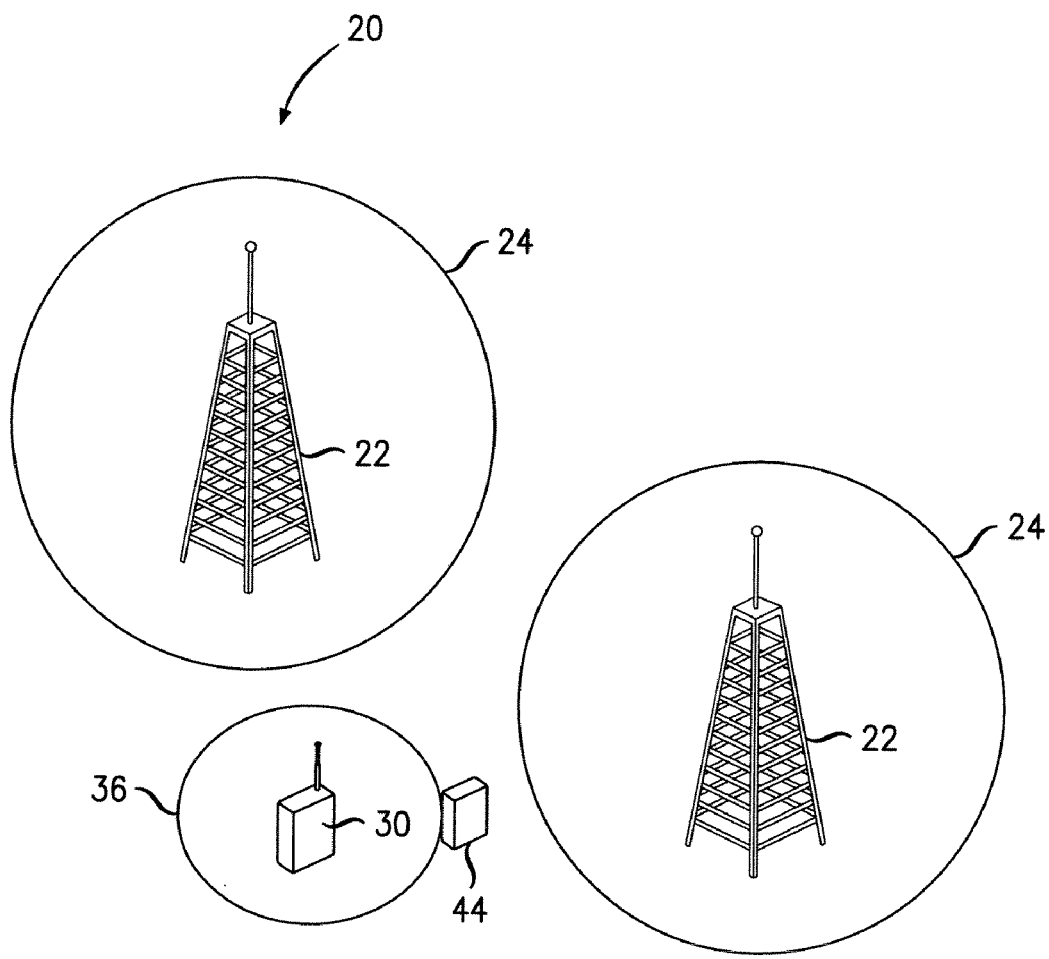
FIG. 1 is a diagram illustrating a wireless communications network according to a first embodiment of the present invention.

As shown in FIG. 1, in one communication network 20, there are two types of base stations (often denoted BS or BSs): macrocell base stations and picocell base stations. Two macrocell base stations 22 for wireless telecommunications are shown for simplicity in FIG. 1. Each macrocell base station has a radio coverage area 24 that is often referred to as a macrocell. The geographic extent of the macrocell 24 depends on the capabilities of the respective macrocell base station 22 and the surrounding geography.

A picocell base station unit (PCBSU) 30 provides wireless communications within a picocell 36. A picocell is a radio coverage area. The radio coverage area of the picocell 30 is much less than that of the macrocell 24. For example, the picocell 36 corresponds in size to a user's home.

It is possible for a mobile terminal 44 within the macrocell 24 to communicate with the macrocell base station 22 in known manner. When the mobile terminal 44 enters into a picocell 36 for which the mobile terminal is registered for communications within the picocell base station 30, it is desirable to handover the connection with the mobile terminal from the macrocell to the picocell. In the example shown in FIG. 1, the user of mobile terminal 44 is a registered user of the picocell base station 36.

Picocell Base Station

Figure 2:
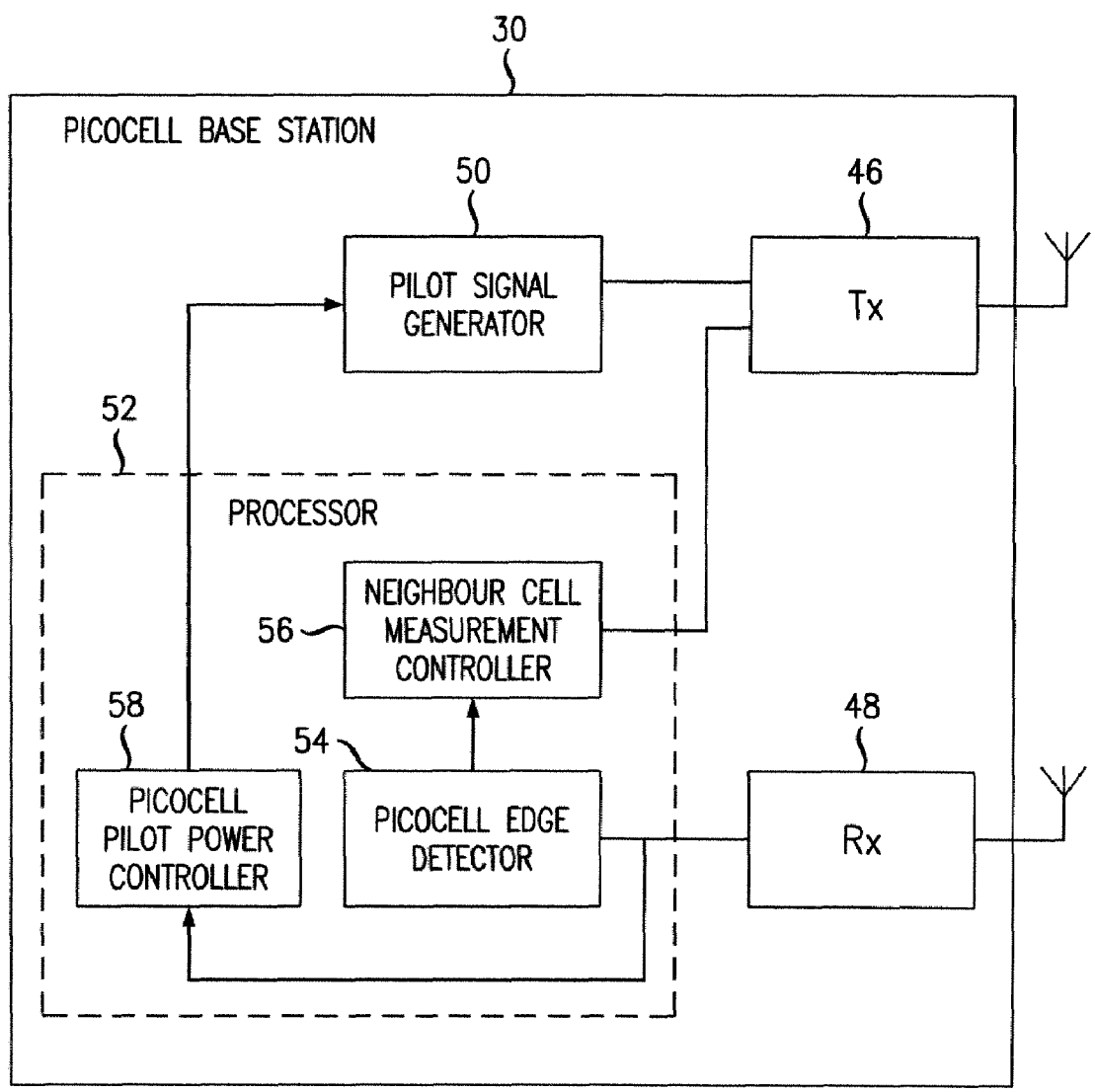
FIG. 2 is a diagram illustrating the picocell base station of the network shown in FIG. 1.

As shown in FIG. 2, the picocell base station 30 includes a transmitter 46 and a receiver 48, a pilot signal generator 50 and a processor 52. The pilot signal generator 50 is connected to the transmitter 46. The processor 52 includes a picocell edge detector 54, a neighbor cell measurement controller 56, and a picocell pilot power controller 58. The picocell edge detector is connected to the receiver 48 and neighbor cell measurement controller 56. The picocell pilot power controller 58 is connected to the pilot signal generator 50.

Operation of the Picocell Base Station

Figure 3:
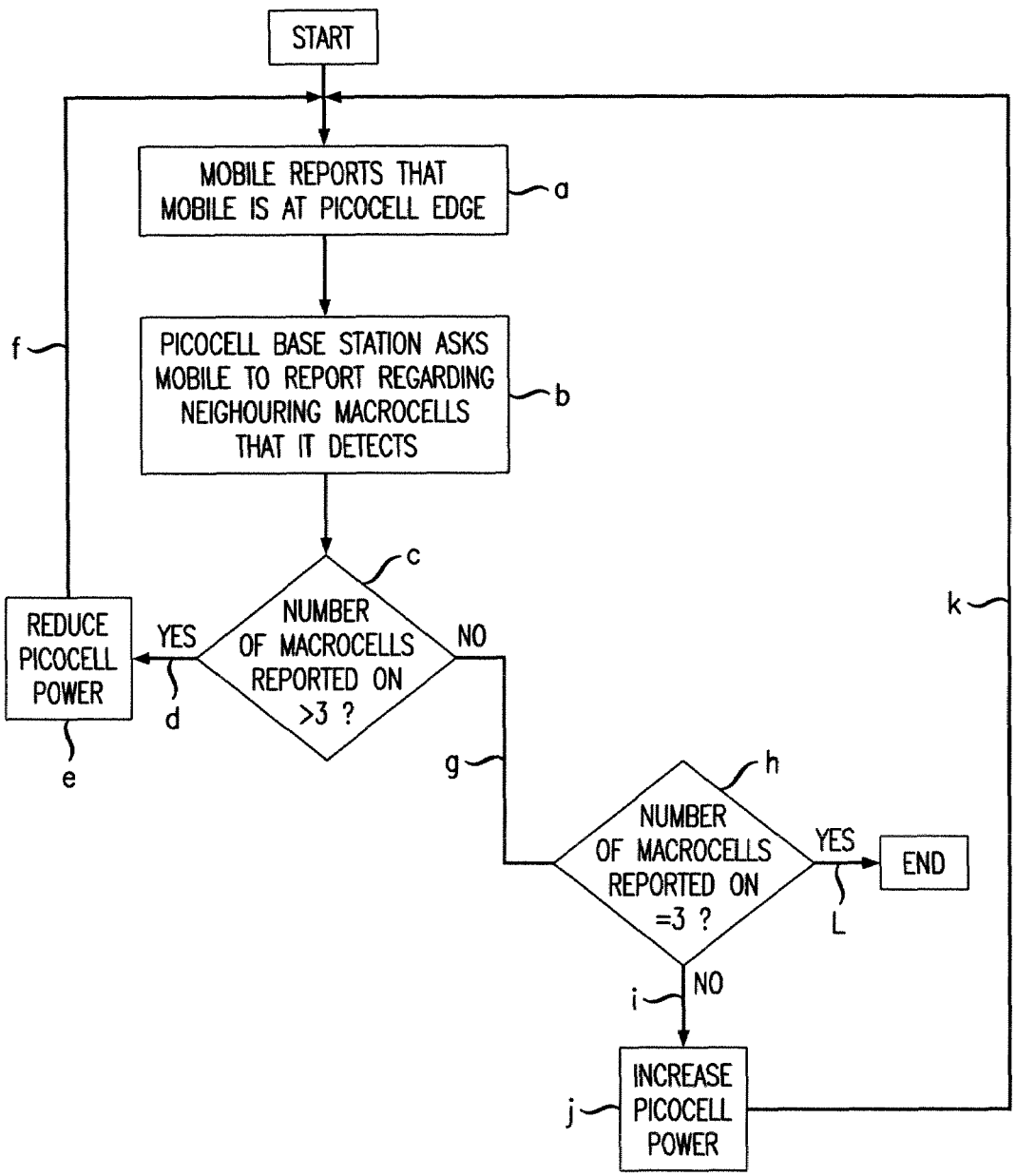
FIG. 3 is a flow chart illustrating the transmit power adjustment method used by the picocell base station.

As shown in FIG. 3, the picocell base station 30 follows a process as follows.

The process starts in that the mobile terminal, in dedicated state (i.e. call-connected) sends periodic measurement reports of signal to interference ratio (Ec/Io) of received pilot signals from the picocell base station. The pilot signal to interference ratio is a measure of the quality of the currently used channel.

The reports are received by the receiver 48 and processed by the picocell edge detector 54.

At some point, the mobile terminal 44 sends a so-called "Event 2d" report (step a) indicating a pilot Ec/Io in a range −19 dB<pilot Ec/Io<−15 dB.

Upon the picocell edge detector 54 determining from the report that the signal to interference ratio (Ec/Io) of received pilot signals from the picocell base station is in the range −19 dB<pilot Ec/Io<−15 dB, the mobile terminal is considered to be at the picocell 32 edge, so the picocell edge detector 54 sends a control signal to the neighbor cell measurement controller 56. The controller 56 then sends via the transmitter 46 a control message asking (step b) the mobile terminal to report as to the number of neighboring macrocells the mobile terminal detects.

This report from the mobile terminal as to number is received by the receiver 48 and passed to the picocell pilot power controller 58. The picocell pilot power controller 58 determines (step c) whether or not the reported number of macrocells is greater than three.

If yes (step d), the picocell pilot power controller 58 controls the pilot signal generator 50 to reduce (step e) the pilot power by a predetermined amount and a return is then made (step f) to the start.

If no (step g), a determination is made (step h) in the picocell pilot power controller 58 as to the whether or not the reported number of macrocells is three. If no (step i) then the picocell pilot power controller 58 controls the pilot signal generator 50 to increase (step j) the pilot power by a predetermined amount and a return is then made (step k) to the start. On the other hand, if yes (step l) i.e. the number of macrocells detected is three, then the pilot signal power is not adjusted and process ends (step m).

Of course the process progresses as each mobile terminal continues to send periodic measurement reports of signal to interference ratio (Ec/Io) of received pilot signals from the picocell base station and at some further points in time, a mobile terminal 44 sends a report (step a) indicating a pilot Ec/Io in a range −19 dB<pilot Ec/Io<−15 dB.

Figure 4A:
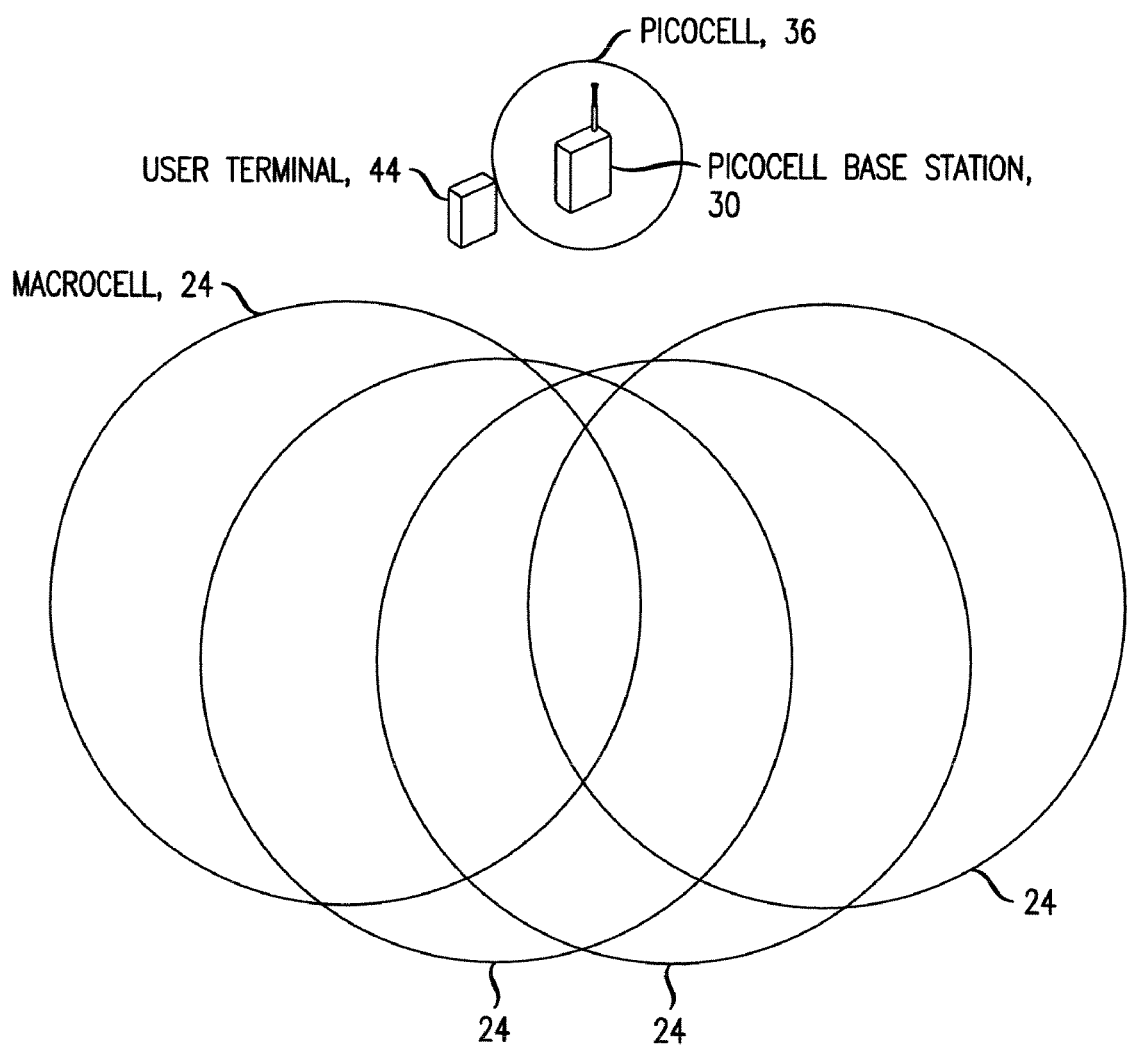
FIGS. 4a, 4b, and 4c illustrate schematically possible picocell base station transmit power levels that may occur, where

As illustrated in FIG. 4a, in the scenario that the mobile terminal 44 at the picocell 36 edge detects less than three macrocells 24, it is considered that the level of picocell base station 30 pilot power is too low such that there is a coverage hole to be "filled", so an increase in pilot power is appropriate, so as to expand the picocell.

Figure 4B:
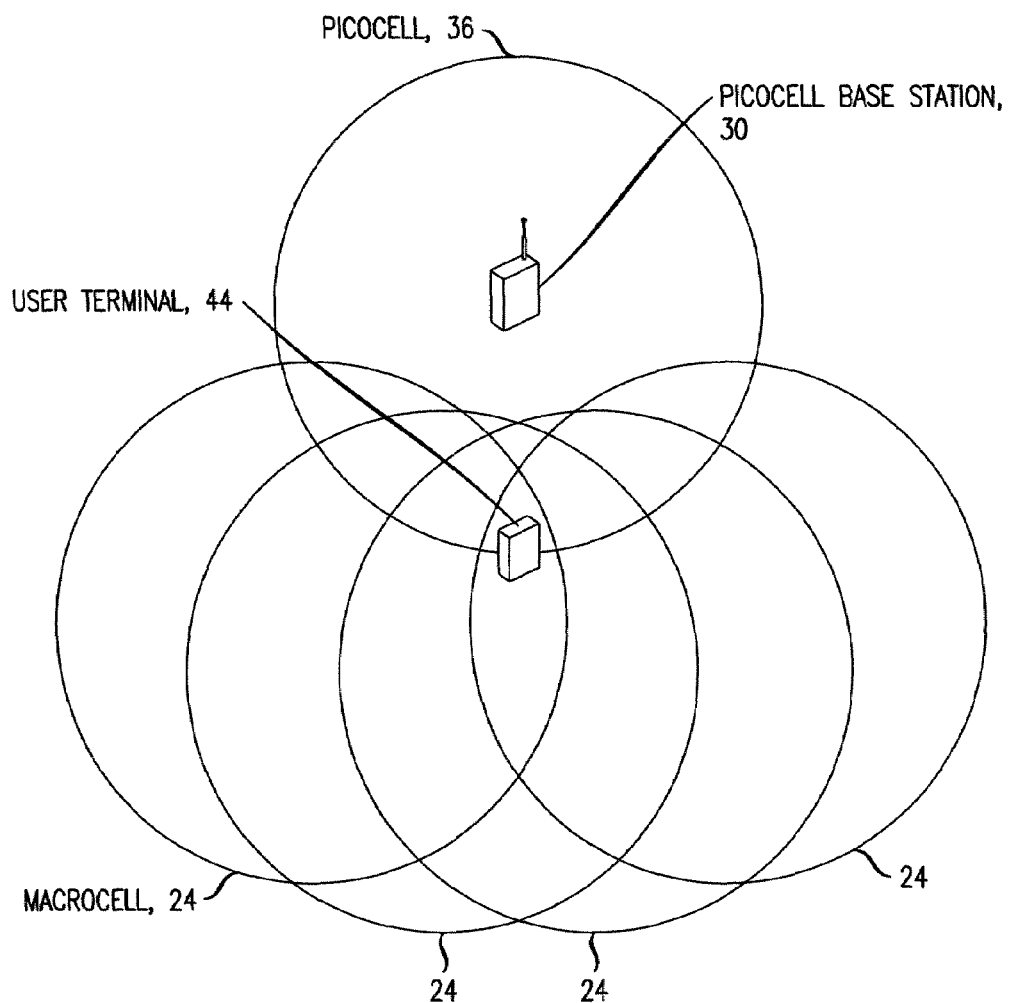

As illustrated in FIG. 4b, in the scenario that the number of macrocells 24 detected by the mobile terminal 44 at the picocell 36 edge is more than three, then it is considered that the level of picocell base station 30 pilot power is too high such that unacceptable interference to the macrocells 24 will occur, so a reduction in pilot power is appropriate, so as to shrink the picocell.

The process typically converges after a few "iterations". Each iteration requires a mobile terminal at the then current picocell edge to trigger the process by a measurement report indicating received pilot power within the predetermined range. Accordingly, different iterations may involve different mobile terminals.

Figure 4C:
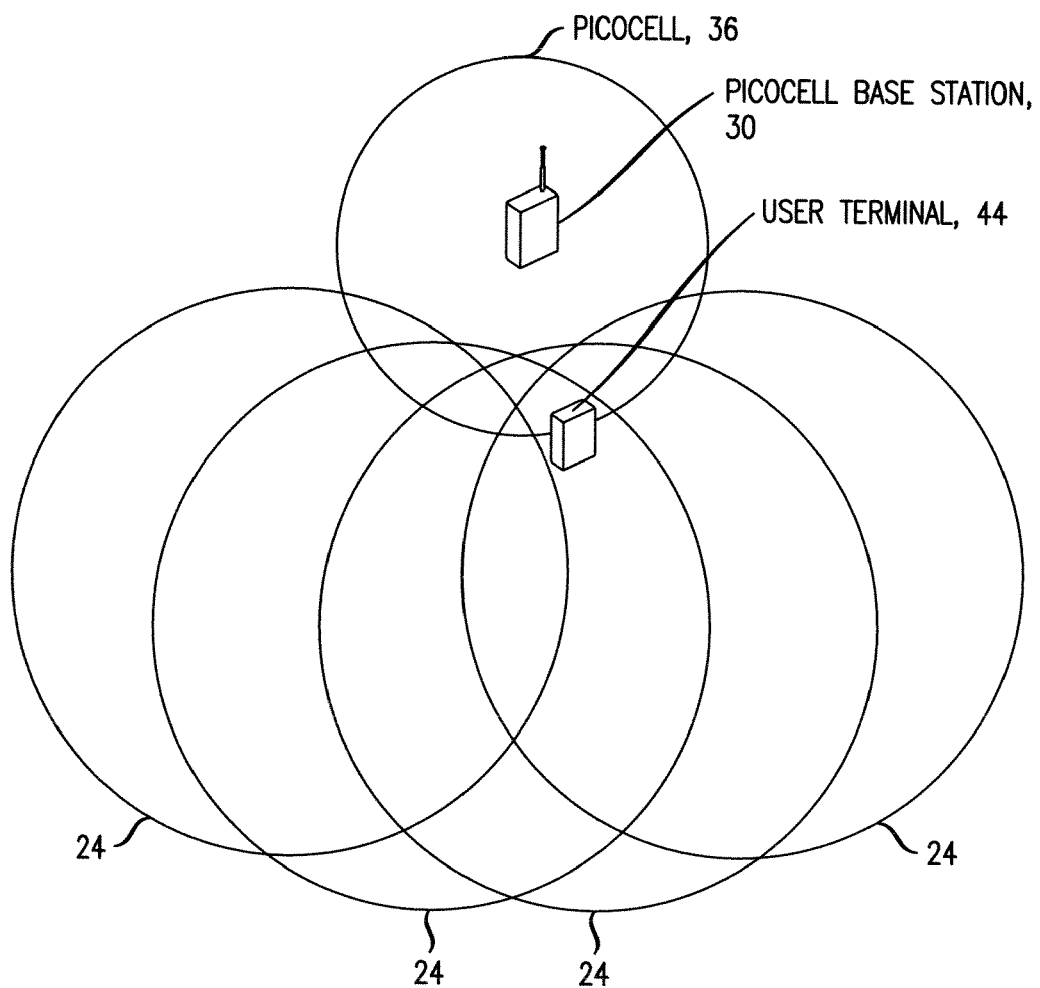

As illustrated in FIG. 4c, the converged scenario is where three macrocells 24 are detected by the mobile terminal 44 at the edge of the picocell 30.

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of controlling transmission power of a picocell base station,
   the method comprising the steps of the picocell base station:
   transmitting a signal at a first power;
   receiving a report from a mobile terminal that the signal is received within a predetermined quality range;
   dependent upon receiving said report instructing the mobile terminal to report as to the number of neighboring macrocells detected by the mobile terminal; and
   controlling the transmission power of a further signal from the picocell base station dependent upon said number.

2. A method according to claim 1, in which the predetermined quality range is such that the mobile terminal is at the picocell coverage area edge.

3. A method according to claim 1, wherein if said number is greater than a predetermined first threshold, the transmission power is decreased.

4. A method according to claim 3, in which the first threshold is three.

5. A method according to claim 1, wherein if said number is less than a predetermined second threshold, the transmission power is increased.

6. A method according to claim 5, in which the second threshold is three.

7. A method according to claim 1, in which the signal is a pilot signal.

8. A method according to claim 1, in which the predetermined quality range is a predetermined range of signal-to-interference ratios.

9. A picocell base station comprising a transmitter, a receiver, a first controller and a second controller,
   the transmitter being configured to transmit a signal at a first power,
   the receiver being configured to receive a report from a mobile terminal that the signal received by the mobile terminal is within a predetermined quality range,
   the first controller being configured to, dependent upon receiving said report, instruct the mobile terminal to report as to the number of neighboring macrocells detected by the mobile terminal,
   the second controller being configured to control the transmission power of a further signal from the picocell base station dependent upon said number.

10. A picocell base station according to claim 9, in which the predetermined quality range is set such that a mobile terminal at the picocell coverage area edge receives the signal within said predetermined quality range.

* * * * *